June 22, 1965    J. MITACEK ETAL    3,190,868
RECOVERY OF POLYMER FROM SOLUTION
Filed Oct. 20, 1960    3 Sheets-Sheet 1

FIG. I

INVENTORS
E. N. PENNINGTON
JOHN MITACEK
BY C. L. MARIZ
Hudson and Young
ATTORNEYS June 22, 1965 J. MITACEK ETAL 3,190,868
RECOVERY OF POLYMER FROM SOLUTION
Filed Oct. 20, 1960 3 Sheets-Sheet 2

INVENTORS
E. N. PENNINGTON
JOHN MITACEK
C. L. MARIZ
BY
Hudson & Young
ATTORNEYS

United States Patent Office 3,190,868
Patented June 22, 1965

3,190,868
RECOVERY OF POLYMER FROM SOLUTION
John Mitacek, Carl L. Mariz, and Edward N. Pennington, all of Bartlesville, Okla., assignors to Phillips Petroleum Company, a corporation of Delaware
Filed Oct. 20, 1960, Ser. No. 63,888
18 Claims. (Cl. 260—94.7)

This invention relates to recovery of polymers from solution.

This application is a continuation-in-part of our application Serial No. 18,989, filed March 31, 1960, now abandoned.

In recent years a great deal of work has been done in the development of new types of polymeric materials, primarily rubbery materials, wherein the polymer is produced in the presence of organometal initiators. The products of such polymerization processes are recovered from the polymerization zone as a solution in a hydrocarbon solvent. Of the various recovery processes suggested, steam stripping appears to have a commercial advantage. However, in some types of operation, difficulties have arisen because the product is not obtained as a crumb dispersed in the water. For subsequent operation, it is preferable to have the polymer as a crumb in a water slurry.

We have discovered a method by which rubber can be obtained in crumb form in a water slurry from a solution of the material in a hydrocarbon solvent.

The object of this invention is to obtain such a slurry.

Accompanying and forming a part of this invention is a drawing comprising

Figure 1:
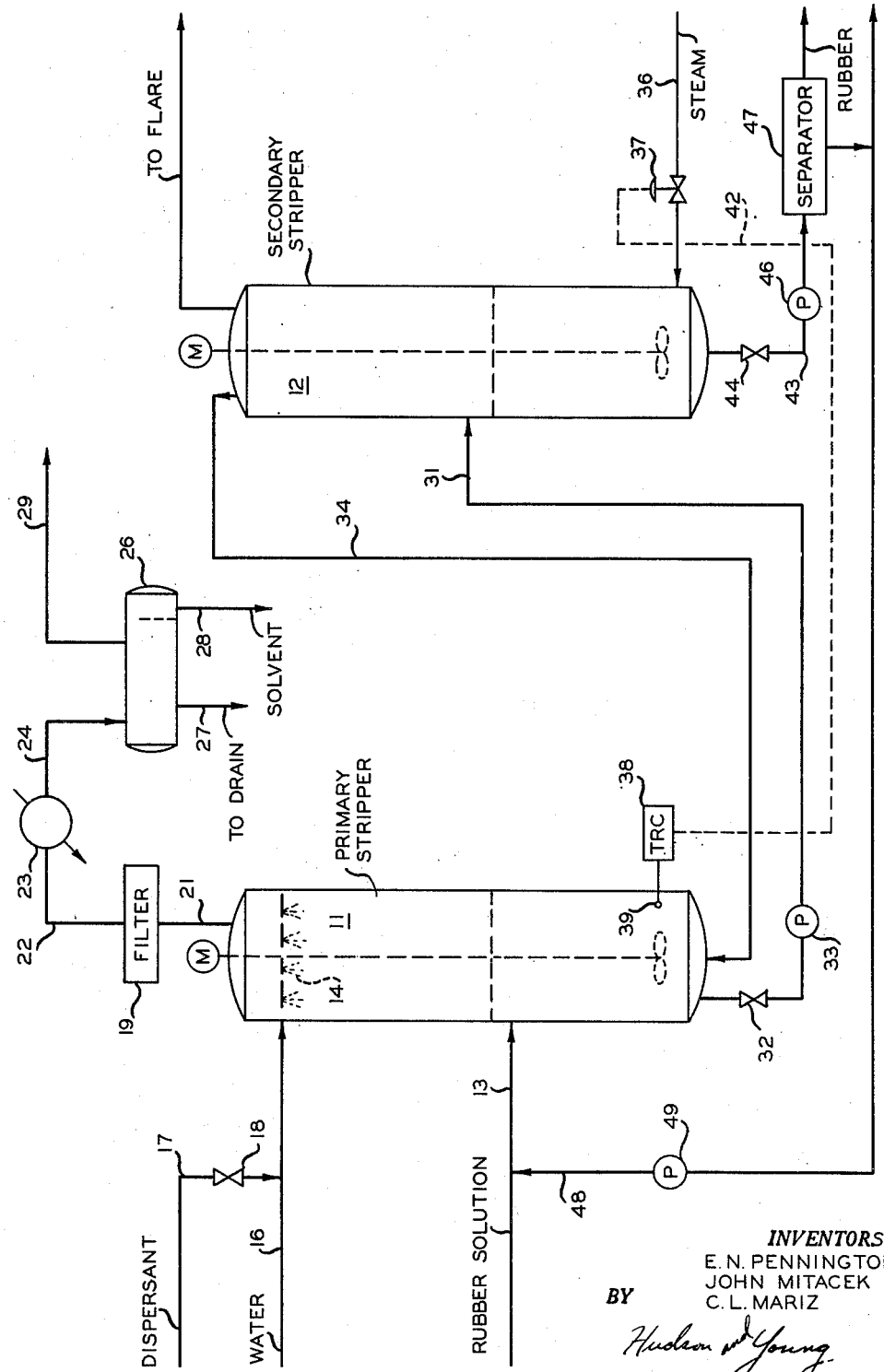
Figure 2:
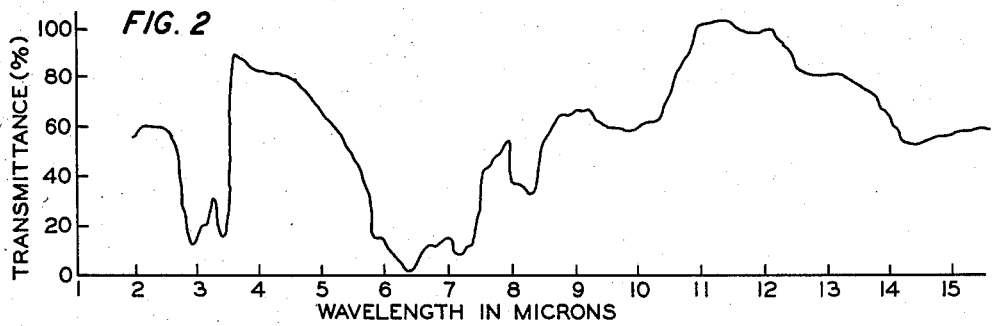
Figure 3:
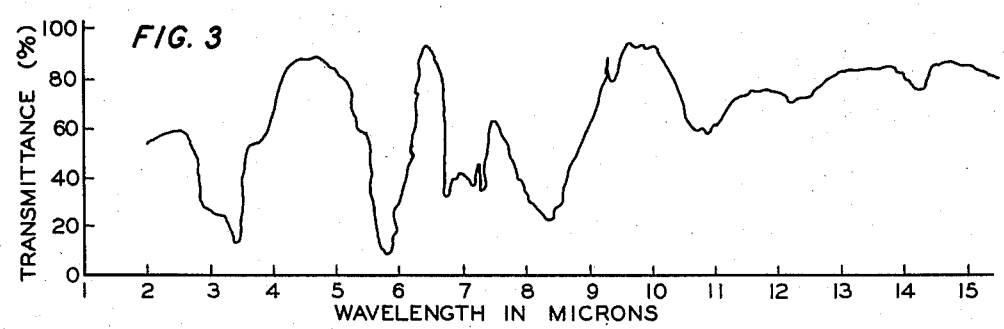
Figure 4:
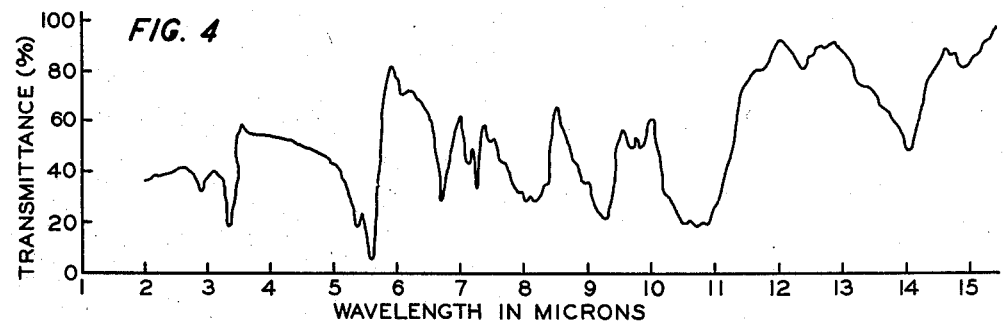
Figure 5:
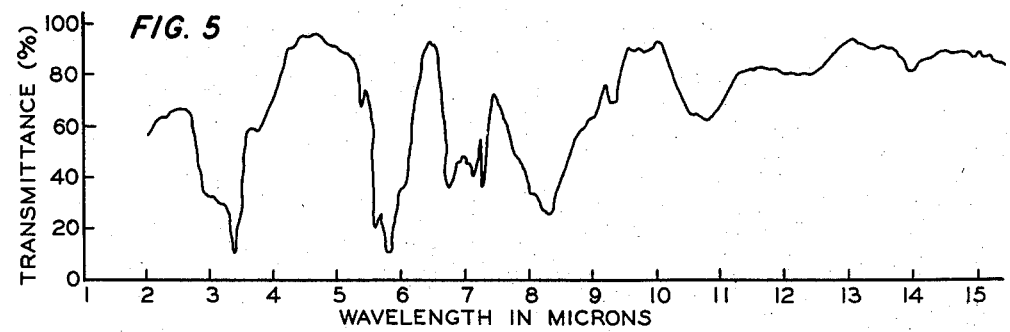
Figure 6:
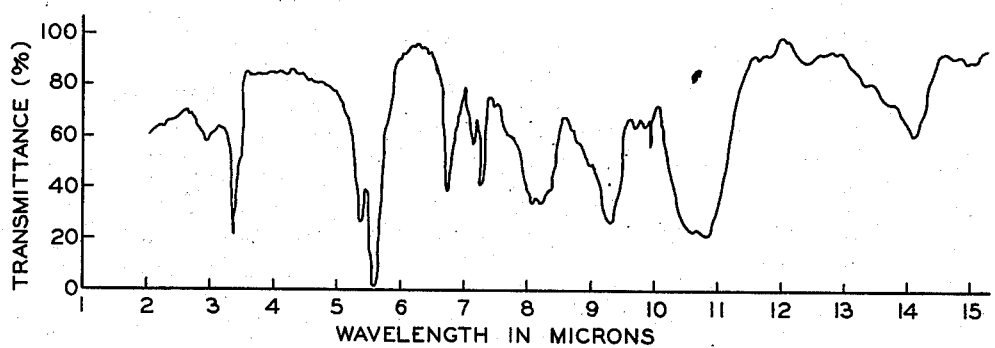

FIGURE 1, a drawing of apparatus, in schematic form, for carrying out the process of our invention;

FIGURE 2, a reproduction of the infrared absorption pattern of Tamol 731, a proprietary product;

FIGURE 3, a reproduction of the infrared absorption pattern of the acid derived from the material of FIGURE 2;

FIGURE 4, a reproduction of the infrared absorption pattern of a diisobutylene/maleic anhydride copolymer prepared in our laboratories;

FIGURE 5, a reproduction of the infrared absorption pattern of the acid derived from the material of FIGURE 4; and FIGURE 6, a reproduction of the infrared absorption pattern of the anhydride of the acid of FIGURE 3.

Broadly, the present invention resides in the discovery that a good crumb can be obtained from a solution of rubber in a hydrocarbon solvent by steam stripping by adding to the aqueous phase in a stripping zone a water-soluble derivative of polymeric substance containing a carbon chain having a plurality of —COOH groups or precursors of —COOH groups. Examples of precursors of —COOH groups include nitrile, amide, and ester groups. The free acid can also be used. Also present in the stripping zone should be a metal ion of a metal selected from the group consisting of calcium, barium, strontium, aluminum, cobalt, iron or nickel. Mixtures of these metal ions can be used. The metal ion is preferably supplied by adding a water soluble salt of one of these metals to the stripping zone. A good crumb is one of reasonably small particle size which has little tendency to coalesce or stick together. Such a crumb can be easily transported as an aqueous slurry and does not stick to the apparatus.

The process of the invention can best be understood from FIGURE 1 which shows a primary stripper 11 and a secondary stripper 12. Rubber solution supply conduit 13 extends to an intermediate portion of primary stripper 11. In the upper portion of this stripper 11 there are provided spray nozzles 14, these being connected to a water supply conduit 16. Communicating with conduit 16 is a dispersant supply conduit 17 having valve 18 therein. Filter 19 is provided, this filter being connected to the upper end portion of stripper 11 by conduit 21. Conduit 22 extends from filter 19 to condenser 23 and conduit 24 extends from condenser 23 to phase separator 26. Phase separator 26 is provided with a water removal conduit 27, a solvent removal conduit 28 and a conduit 29 extending to a flare (not shown). Conduit 31 extends from the lower end portion of stripper 11 to an intermediate portion of stripper 12, this conduit having valve 32 and pump 33 therein. Conduit 34 extends from the upper end portion of stripper 12 to the lower end portion of stripper 11. Steam supply conduit 36 extends into the lower end portion of stripper 12, this conduit being provided with motor valve 37 therein. A temperature recorder controller 38 is connected to temperature sensing means 39 in the lower portion of stripper 11 and the output from controller 38 is operatively connected to motor valve 37 by conduit 42. Conduit 43, having valve 44 and pump 46 therein, extends from the lower end portion of stripper 12 to a separator 47. Conduit 48, having pump 49 therein, provides water recycle from the separator to stripper 11.

The polymeric dispersing agents with which this invention is concerned are substances containing carboxyl groups, which agents in the form of the free acid or alkali metal salt are soluble in water. They are surface-active. Such polymers can be obtained by polymerizing acrylic and α-substituted acrylic acids of the structure

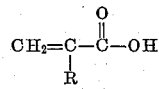

where R is hydrogen or an alkyl group containing up to 5 carbon atoms including methyl, ethyl, propyl, isopropyl, straight and branched chain butyl, and straight and branched chain amyl, either alone or mixed with each other or with other polymerizable organic compounds containing the $$CH_2=C<$$

group. They may also be obtained by complete or partial hydrolysis or saponification of water-insoluble polymers containing ester, amide, nitrile or other groups which on hydrolysis can be converted to carboxyl groups. Examples include acrylic acid, methacrylic, other α-alkacrylic acids, and the corresponding amides, esters, nitriles, etc. Polymers thus produced are polyacrylic acid, polymethacrylic acid, etc.

In addition to the above-mentioned polymers, copolymers containing carboxyl or saponifiable groups are also operable. These copolymers may be prepared from a polymerizable material containing no saponifiable groups and one or more polymerizable acids or materials of the type described which do contain such saponifiable groups. In such cases the proportion of saponifiable material or acid must be great enough so that the alkali metal salts of the polymer are soluble in water. Examples of such polymerizable materials containing no saponifiable groups are styrene, vinyl chloride, butadiene, coumarone, etc. Polymers include acrylic acid-styrene copolymers, methacrylic acid/butadiene copolymers, etc.

Furthermore, unsaturated acids or their esters which of themselves do not polymerize by normal free radical generating systems can be polymerized jointly with compounds of the types described above to yield water-soluble materials suitable for use in the process of the invention described herein. Maleic acid is an example of this kind of acid.

Maleic acid and its anhydride will also polymerize with 1-olefins to produce polymers suitable for use in this invention. Similar unsaturated acids, their anhydrides, salts, and esters, including half esters, can also be used. These can be shown by the formulas

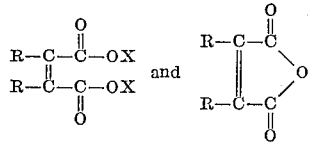

where each R is individually selected from the group consisting of hydrogen, methyl, and ethyl, and X is individually selected from the group consisting of hydrogen, methyl, ethyl, propyl, butyl, lithium, sodium, potassium, rubidium, and cesium. Examples include maleic acid, maleic anhydride, fumaric acid, methylmaleic acid, dimethyl maleic acid, ethylmaleic acid, diethylmaleic acid, dimethyl maleate, diethyl dimethylmaleate, monomethyl monomethylmaleate, dibutyl diethylfumaric, di-n-propyl monomethylfumarate, methyl ethyl maleate, monomethylmaleic anhydride, diethylmaleic anhydride, methylethylmaleic anhydride, sodium dimethylmaleate, potassium diethylfumarate. Mixtures of these materials can be used.

The olefins should contain 4 to 16, preferably 6 to 10, carbon atoms. Examples include 1-butene, isobutylene, 1-pentene, 2-methyl-1-butene, 3-methyl-1-butene, 1-hexene, 1-heptene, 1-octene, 2,4,4-trimethyl-1-pentene (diisobutylene), 1-nonene, 1-tetradecene, and 1-hexadecene. Mixtures of olefins can be used.

Examples of these copolymers include those of maleic acid/1-butene, fumaric acid/1-pentene, dimethylmaleic acid/3-methyl-1-butene, ethylmaleic acid/1-octene, etc.

Copolymers of 1-olefins and maleic anhydride have been made for many years. They can be made by copolymerizing the anhydride, preferably in solution in an organic diluent such as benzene, with the olefin in the presence of a peroxide catalyst. Elevated temperatures and superatmospheric pressures are usually employed. The monomers copolymerize in substantially equimolar proportions.

The sodium salt of a copolymer of diisobutylene and maleic anhydride is especially suitable in the process of this invention. Such a product is that sold under the trademark Tamol 731 by Rohm and Haas. A similar product is sold under the trademark Trenamine W-25 by Alco Oil and Chemical Corporation.

Another group of monomers from which dispersing agents can be obtained has the structure

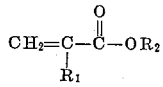

where $R_1$ is H or an alkyl group containing up to 5 carbon atoms including methyl, ethyl, propyl, isopropyl, straight and branched butyl, and straight and branched chain amyl groups. The most readily available members of this type of compound are the esters of acrylic acid and methacrylic acid. $R_2$ is an alkyl group containing from 1 to 10 carbon atoms, examples being methyl, ethyl, propyl, isobutyl, normal amyl, 3-ethylhexyl and 4-ethyloctyl.

After the polymer is produced, the ester can be saponified to produce the water soluable material by replacing 20 to 100 percent of the $R_2$ groups by an alkali metal. Frequently, the ester is hydrolyzed ot replace about 60 to 70 percent of the $R_2$ groups with sodium. When 2-ethylhexyl acrylate is polymerized and partially or completely saponified, the material can be represented by the following structure:

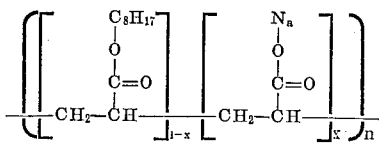

where $x$ is 0.2 to 1 and $n$ is 5 to 100.

FIGURE 2 is a reproduction of an infrared absorption spectrum of Tamol 731. The absorption bands at 6.4 and 7.2 microns show the presence of COO⁻ groups. FIGURE 3 shows the spectrum of the corresponding acid. Absorption bands at 3.2 to 3.8, 5.8, 8.4 and 10.8 microns show the presence of carboxyl groups. FIGURES 4 and 5 show the absorption spectrum for the anhydride and the corresponding acid of a copolymer of diisobutylene and maleic acid prepared in our laboratory. FIGURE 6 shows the spectrum of the anhydride of the acid of FIGURE 3. The agreement between FIGURES 3 and 5 and 4 and 6 establish the structure of Tamol 731.

For the saponification various methods can be used. It is preferable to produce the potassium and sodium salts because these salts are particularly effective. However, the lithium salts can also be used.

For use in the present invention the polymeric dispersing agent should have a molecular weight in the range of 500 to 10,000, preferably 800 to 3,000, as determined by the Rast method.

A water soluble salt which will provide a polyvalent metal ion should also be present in the aqueous dispersion of the polymer crumb during the steam stripping. Barium and calcium ions are particularly effective although strontium, aluminum, iron, cobalt and nickel can also be used. The water soluble salt used should be soluble to the extent that the metal ion is present in an amount of at least 3 parts per million parts of water on an equivalent weight basis. The salt should be added in an amount to provide 0.02 to 2, preferably 0.05 to 1, equivalent weight of metal ion per million parts of water using the same units of weight. More can be used. Within these limitations, any water soluble salt of these metals can be used. These include the halides, chlorine, bromine, fluorine, iodine, and the nitrates, sulfates, phosphates, hydroxides, bicarbonates, carbonates and salts of organic acids such as the formates, acetates, propionates, and butyrates.

Examples of these water soluble compounds include calcium chloride, calcium hydroxide, barium bromide, strontium chloride, aluminum iodide, ferric chloride, ferrous chloride, calicum nitrate, barium hydroxide, barium nitrate, strontium phosphate, aluminum hydroxide, ferric acetate, calcium formate, cobaltous chloride, cobaltic iodide, cobaltous nitrate, nickel chloride, and nickel acetate.

The polymeric dispersing agent should be used in an amount of 0.05 to 1 part by weight per 100 parts of rubber recovered. Amounts within the lower portion of this range, up to 0.3 part by weight per 100 parts of rubber, are generally used. It is usually added as an aqueous solution containing 10 to 50 percent, preferably about 25 percent, of the dispersing agent by weight.

In this system, it is possible to recover rubber crumb from various types of rubber in solution. These rubbery polymers are prepared by polymerizing a monomer system containing a single monomer or a mixture containing at least a major portion of conjugated dienes containing 4 to 8 carbon atoms. Examples of conjugated dienes which can be used include, 1,3-butadiene, isoprene, 2,3-dimethylbutadiene, 2-methoxybutadiene, 1,3-hexadiene, and 1,3-octadiene. These conjugated dienes can be polymerized either alone or in admixture with each other and/or with one or more other compounds containing an active $CH_2=C<$ group which are copolymerizable therewith. Suitable comonomers containing this group include styrene, acrylonitrile, methyl acrylate, methyl methacrylate, vinyl chloride, methyl vinyl ether, ethylene, propylene, 1-butene, 1-propene, 1-octene and the like. Preferably, at least 70 percent conjugated diene by weight is used in the monomer mixture when copolymers are prepared.

The polymers are prepared in the presence of organic solvents including paraffins, cycloparaffins and aromatic hydrocarbons which are relatively inert, non-deleterious and liquid under the conditions of the process. Examples include the lower molecular weight alkanes, such as propane, butane, pentane, hexane, heptane, isooctane, cycloparaffins, such as cyclohexane, methylcyclohexane, and aromatic compounds, such as benzene, toluene, and the like.

A large number of initiator systems are suitable for the production of the polymers.

One type of initiator system is a two or more component system wherein one component is an organometal compound of the metals of Groups I, II, and III, including those where one or more but not all of the organo groups is replaced by a halogen; a metal hydride; or a metal of Group I, II or III; and the second component is a Group IV to VI compound, e.g., salt or alcoholate. This type of initiator system is fully described with a group of examples in columns 5 and 8 of Patent No. 2,886,561, dated May 12, 1959.

Another initiator system which is suitable involves the use of a compound of the formula $R(Li)_x$, wherein R is a hydrocarbon radical selected from the group consisting of aliphatic, cycloaliphatic and aromatic radicals and combinations of these radicals and $x$ is an integer from 1 to 4, inclusive. The aliphatic and cycloaliphatic radicals can be saturated or contain olefinic unsaturation. The R in the formula has a valence equal to the integer, and preferably contains from 1 to 20, inclusive, carbon atoms, although it is within the scope of the invention to use higher molecular weight compounds. Examples of these compounds include methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8 - tetralithiodecane, 1,5,10,20 - tetralithioeicosane, 1,2,4,6-tetralithiocyclohexane, 1,2,3,5-tetralithio-4-hexylanthracene, 1,3-dilithio-4-cyclohexene, and the like.

The amount of organolithium initiator employed can vary over a broad range. In general, the amount of initiator used will be in the range from 0.3 to 100 milliequivalents of lithium per 100 parts by weight of total monomers charged and will preferably be in the range from 0.6 to 15 milliequivalents of lithium per 100 parts by weight of total monomers charged. When n-butyllithium is employed as the initiator for the production of an easily processable 40 to 60 Mooney rubber (ML-4 at 212° F.), the quantity of initiator required will generally be in the range from 2 to 2.4 millimoles per 100 parts of total monomers charged.

Still another initiator system utilizes a cobalt compound and a metal alkyl wherein one but not all of the alkyl groups can be replaced by halogen. Metal alkyls of the Group III metals, as exemplified by aluminum, are used in this system. Examples of these organometal compounds include trialkyl aluminums, such as triethylaluminum and triisobutylaluminum and alkyl aluminum halides, such as ethylaluminum dichloride and diethylaluminum chloride. For the cobalt compound, the cobaltous form is preferred. Examples of these compounds include cobaltous chloride, cobaltous sulfate, cobaltous nitrate, and the salts of organic acids, such as cobaltous acetate.

Some of the systems included within the above description have been found particularly suitable for the production of polymers having particular molecular configuration. For instance, polybutadiene having 85 to 100 percent of the polymer formed by cis 1,4-addition can be prepared using initiator systems comprising triisobutylaluminum and titanium tetraiodide; triisobutylaluminum, titanium tetrachloride, and iodine; and triisobutylaluminum, titanium tetraiodide, and titanium tetrachloride. Polybutadiene having 70 to 100 percent of the polymer formed by trans-1,4-addition can be prepared using an initiator system comprising lithium aluminum hydride and titanium tetraiodide. The catalyst system comprising lithium aluminum hydride and titanium tetrachloride produces a polybutadiene having a major amount of the polymer formed by 1,2-addition. Similar products are obtained using isoprene except that a portion of the product can be formed by 3,4-addition.

To determine the amount of the addition of the various types, the polymers can be dissolved in carbon disulfide to form a solution having 20 grams of polymer per liter of solution. The infrared spectrum of such a solution (percent transmission) is then determined in a commercial infrared spectrometer.

The percent of the total unsaturation present as trans 1,4- is calculated according to the following equation and consistent units:

$$\epsilon = \frac{E}{tc}$$

where:
$\epsilon$=extinction coefficient (liters - mols$^{-1}$ - microns$^{-1}$);
$E$=extinction (log $Io/I$); $t$=path length (microns); and $c$=concentration (mols double bond/liter). The extinction is determined at the 10.35 micron band and the extinction coefficient used is $1.21 \times 10^{-2}$ (liters-mols$^{-1}$-microns$^{-1}$).

The percent of the total unsaturation present as 1,2- (or vinyl) is calculated according to the above equation, using the 11.0 micron band and an extinction coefficient of $1.52 \times 10^{-2}$ (liters-mols$^{-1}$-microns$^{-1}$).

The percent of the total unsaturation present as cis 1,4- is obtained by subtracting the trans 1,4- and 1,2- (vinyl) determined according to the above methods from the theoretical unsaturation assuming one double bond per each $C_4$ unit in the polymer.

For treatment, it is preferred that the concentration of the polymer in the solvent be in the range of 5 to 15 percent rubber by weight. However, the broader range of 1 to 25 percent rubber is applicable, the higer concentration resulting in greater difficulty in mixing the rubber solution with the water. If effective mixing systems are available, it is quite possible to work with solutions containing more than 15 percent rubber.

The following examples illustrate the advantage obtained by using our invention:

*Example I*

In this example, a series of runs were made with and without the additives and the polymer recovered. In each run a solution of rubber in toluene was treated, the rubber being a polymer of 1,3-butadiene wherein 95 percent of the polymer was formed by cis 1,4-addition in the presence of an initiator system comprising triisobutylaluminum, titanium tetrachloride, and titanium tetraiodide. Rosin acid was used to shortstop the polymerization and 2,2'-methylene bis(4-methyl-6-tertiarybutylphenol) was added as an antioxidant. The polymer was recovered in apparatus similar to that shown in FIGURE 1. Each stripping zone was a 500-gallon tank maintained approximately one-third full of water. The polymer solution was introduced with a large part of the solvent flashing off very quickly, leaving rubber containing solvent in the aqueous phase. The residence time for the polymer in the first and second strippers was 30 minutes for each stripper in all cases except Run 5 wherein the times were 60 minutes. In the first run no additive was used and it will be noted that crumb was not obtained and that the stripper plugged. The rubber precipitated as a sticky mass. In the second run the polymeric material, Tamol 731, was used but no metal ion other than sodium (from the Tamol 731) was present. Steam condensate provided the water. Again operation was unsatisfactory with plugging of the stripper. The third run shows operation according to this invention with Tamol 731 and calcium ion present, this material having been added as calcium nitrate in an amount of 0.024 part by weight per 100 parts of rubber. The calcium content of the stripper water was 0.14 equivalent weight per million parts of water using the same units of weight. Good crumb was obtained. Run 4 shows that the metal ion alone is unsatisfactory, this run resulting in plugging of the stripper when calcium ions were present but Tamol 731 was not used. Runs 5 and 6 show operation according to this invention with higher additive addition rates of Tamol 731. In these runs the calcium was added in the form of calcium chloride. Details are shown in the following table:

Example V

In two additional runs FeCl$_2$ and FeCl$_3$ were added to the stripper water together with Tamol 731. In the first run 320 ml. of 6 weight percent solution in toluene of cis-polybutadiene of the type described in Example I was steam stripped at 196° F. To the stripper water was added 0.020 weight percent Tamol 731 and 0.002 weight percent ferric, corresponding to 0.12 equivalent parts weight of ferric ion per million parts of water. The run lasted 30 minutes and good crumb was produced.

In the second run, 160 ml. of a similar rubber solution containing 7 weight percent polymer was steam stripped at 198° F. in a 17 minute run. Tamol 731 was present in the amount of 0.020 weight percent, was well as 0.0058 weight percent ferrous ion, corresponding to 0.52

| Run No. | Rate g.p.m. | Rubber content, wt. percent | Inherent viscosity of rubber | Temp., °F. | | Pressure, p.s.i.g. | | Stripper water, additive level | | | Additive addition rate, p.h.r. | | Water-rubber slurry conc., wt. percent | Length of run, min. | Remarks |
|---|---|---|---|---|---|---|---|---|---|---|---|---|---|---|---|
| | | | | Stripper No. 1 | Stripper No. 2 | Stripper No. 1 | Stripper No. 2 | Wt. percent Tamol 731 | Wt. percent Ca | Equivalents of metal ion per million parts H$_2$O | Tamol 731 | Ca$^{++}$ | | | |
| 1 | 1.0 | 7.98 | 2.42 | 198 | 220 | 1.5 | 2.5 | None | None | None | None | None | a 1.3 | 345 | No crumb, stripper plugged. |
| 2 | 0.5 | 15.90 | 2.56 | 200 | 220 | 0.5 | 1.5 | 0.008 | None | None | 0.037 | None | a 1.3 | 25 | Do. |
| 3 | 1.1 | 7.01 | 2.16 | 200 | 219 | 1.0 | 2.0 | 0.008 | 0.0011 | 0.14 | 0.23 | 0.024 | 1.3 | 740 | Good crumb. |
| 4 | 1.0 | 7.10 | 2.71 | 200 | 218 | 1.0 | 2.0 | None | 0.0054 | 0.68 | None | (b) | a 1.2 | 60 | Stripper plugged. |
| 5 | 3.0 | 7.79 | 2.52 | 202 | 227 | 2.0 | 4.0 | 0.008 | 0.0015 | 0.19 | 0.275 | 0.004 | 7.7 | 690 | Good crumb. |
| 6 | 0.7 | 10.75 | 2.40 | 200 | 221 | 1.5 | 2.5 | 0.0075 | 0.0007 | 0.09 | 0.392 | 0.002 | 1.2 | 275 | Do. | a Amount of crumb that should have been produced, if run had been satisfactory. b All calcium added at beginning of run.

Example II

An 8.76 weight percent solution in toluene of cis-polybutadiene of the type of Example I was steam stripped at 200° F. using a stripping zone containing 2000 ml. water. About 350 ml. of solution was used in the 30 minute run. At the start of the run the levels of additives in the stripper water were 0.020 weight percent Tamol 731 and 0.007 weight percent barium, corresponding to 0.25 equivalent weight of barium ion per million parts of water using the same units of weight. The barium ion was added in the form of barium chloride. Good rubber crumb was produced.

Example III

A normal hexane solution containing 9.28 weight percent trans-polybutadiene, with 90 percent of the polymer formed by trans 1,4-addition in the presence of an initiator system comprising lithium aluminum hydride and titanium tetraiodide, was steam stripped at 181° F. in the presence of 0.020 weight percent Tamol 731 and about 0.0012 weight percent calcium, corresponding to 0.15 equivalent weight of calcium ion per million parts of water. In the 61 minute run 400 ml. of solution was used. Good rubber crumb was produced. The Mooney (ML-4) at 223° F. was 22.

In a second run under similar conditions, no rubber crumb was produced in the absence of Tamol 731, the rubber coagulating as a sticky mass.

Example IV

A five weight percent solution in normal hexane of cis-polyisoprene, with 92 percent of the polymer formed by cis, 1,4-addition, was steam stripped at 197° F. in the presence of 0.016 weight percent Tamol 731 and 0.0015 weight percent calcium, corresponding to 0.19 equivalent weight of calcium ion per million parts of water. In the 49 minute run 350 ml. of rubber solution was used. Good rubber crumb was produced. The Mooney (ML-4) at 212° F. was 57.

equivalent weight of ferrous ion per million parts of water. Good rubber crumb was produced.

Example VI

A reaction vessel equipped with a condenser was charged with, on a weight basis, 100 parts diisobutylene, 74 parts maleic anhydride, and 83 parts benzene. The mixture was heated to reflux and 1.5 parts by weight of benzoyl peroxide added. The reaction mixture, under an atmosphere of nitrogen, was refluxed for 2.5 hours and then poured into boiling water. The product, a copolymer of diisobutylene and maleic anhydride, was filtered from the water and washed with deionized water.

A portion of the product, 25 parts by weight, was converted to the sodium salt by contacting same with 9.73 parts of 98 percent sodium hydroxide in 182 parts of water. FIGURE 4 is the infrared spectrum of this product.

A 4.1 weight percent solution in toluene of cis-polybutadiene of the type of Example I was steam stripped at 195 to 202° F. About 300 ml. of solution was used in the 30 minute run. At the start of the run the levels of additives in the stripper water were 0.020 weight percent of the sodium salt of the diisobutylene-maleic anhydride copolymer (preparation just described) and approximately 0.2 equivalent weight of calcium ion per million parts of water. Good rubber crumb was produced.

Example VII

When strontium chloride, aluminum iodide, cobaltous chloride, or nickel chloride is substituted for the barium chloride of Example II, good results are obtained.

The recovery process of this invention is applicable to the recovery of many different rubbery polymers from solution. One particular polymer is the butadiene polymer formed by cis 1,4-addition in the presence of an initiator system comprising triisobutylaluminum, titanium tetrachloride, and titanium tetraiodide. This polymer is produced in polymerization zone operated at 30 to 40° F.

and a pressure of 65 p.s.i.a. At the end of this series of reactors the reaction is shortstopped by the addition of rosin acid and 2,2'-methylene bis-(4-methyl-6-tertiary-butyl phenol) added as an antioxidant. Some of the solvent is removed in a series of three flash zones operated at 227 to 235° F. and a pressure of 16 p.s.i.a. This solution is mixed with water and fed to the first stripper.

As many possible embodiments can be made of this invention without departing from the scope thereof, it is to be understood that all matter herein set forth is to be interpreted as illustrative and not as unduly limiting the invention.

We claim:

1. In the process of recovering a rubbery polymer prepared by polymerizing a monomer mixture containing at least a major proportion of a conjugated diene from a solution thereof in a solvent by steam stripping to produce rubber crumb in the aqueous phase, the improvement comprising adding during said stripping (1) a dispersing agent selected from the group consisting of water soluble polymeric substances containing a carbon chain having a plurality of —COOH groups, water soluble derivatives of polymeric substances containing a carbon chain having a plurality of —COOH groups, and (2) ions of a metal selected from the group consisting of calcium, strontium, barium, aluminum, iron, cobalt and nickel.

2. In the process of recovering a rubbery polymer prepared by polymerizing a monomer mixture containing at least a major proportion of a conjugated diene from a solution thereof in a solvent by stream stripping to produce rubber crumb in the aqueous phase, the improvement comprising adding during said stripping a water soluble polymer of a compound of the formula

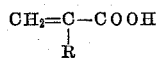

where R is selected from the group consisting of H and alkyl groups containing 1 to 5 carbon atoms, and ions of a metal selected from the group consisting of calcium, strontium, barium, aluminum, iron, cobalt and nickel.

3. In the process of recovering a rubbery polymer prepared by polymerizing a monomer mixture containing at least a major proportion of a conjugated diene from a solution thereof in a solvent by steam stripping to produce rubber crumb in the aqueous phase, the improvement comprising adding during said stripping a water soluble alkali metal salt of a polymer of a compound of the formula

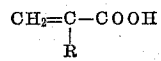

where R is selected from the group consisting of H and alkyl groups containing 1 to 5 carbon atoms, and ions of a metal selected from the group consisting of calcium, strontium, barium, aluminum, iron, cobalt, and nickel.

4. The process of claim 1 wherein the rubbery polymer is selected from the group consisting of cis-polybutadiene, trans-polybutadiene, cis-polyisoprene, and trans-polyisoprene.

5. In the process of recovering a rubbery polymer prepared by polymerizing a monomer mixture containing at least a major proportion of a conjugated diene from a solution thereof in a solvent by stream stripping to produce rubber crumb in the aqueous phase, the improvement comprising adding during said stripping (1) a water soluble salt of a copolymer of a 1-olefin containing 4 to 16 carbon atoms and a compound selected from the group consisting of

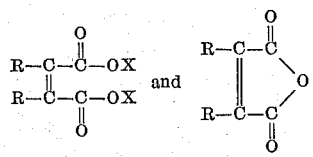

where each R is individually selected from the group consisting of hydrogen, methyl and ethyl and X is individually selected from the group consisting of hydrogen, methyl, ethyl, propyl, butyl, and alkali metal, and (2) ions of a metal selected from the group consisting of calcium, strontium, barium, aluminum, iron, cobalt and nickel.

6. In the process of recovering cis-polybutadiene from a solution thereof in solvent by steam stripping to produce rubber crumb in the aqueous phase, the improvement comprising adding during said stripping (1) a water soluble salt of a copolymer of a 1-olefin containing 4 to 16 carbon atoms and a compound selected from the group consisting of

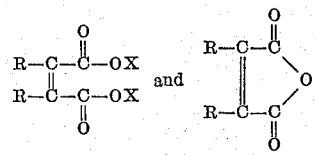

where each R is individually selected from the group consisting of hydrogen, methyl, and ethyl and X is individually selected from the group consisting of hydrogen, methyl, ethyl, propyl, butyl, sodium, and potassium, and (2) ions of a metal selected from the group consisting of calcium, strontium, barium, aluminum, iron, cobalt, and nickel.

7. In the process of recovering cis-polybutadiene from a solution thereof in toluene by steam stripping to produce rubber crumb in the aqueous phase, the improvement comprising adding during said stripping (1) a water soluble salt of a copolymer of a 1-olefin containing 4 to 16 carbon atoms and a compound selected from the group consisting of

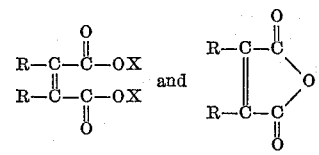

where each R is individually selected from the group consisting of hydrogen, methyl, and ethyl and X is individually selected from the group consisting of hydrogen, methyl, ethyl, propyl, butyl, sodium, and potassium, and (2) ions of a metal selected from the group consisting of calcium, strontium, barium, aluminum, iron, cobalt and nickel.

8. In the process of recovering cis-polybutadiene from a solution thereof in toluene by steam stripping to produce rubber crumb in the aqueous phase, the improvement comprising adding during said stripping a sodium salt of a copolymer of maleic anhydride and diisobutylene with a molecular weight of approximately 1500 and calcium ions.

9. In the process of recovering cis-polybutadiene from a solution thereof in toluene by steam stripping to produce rubber crumb in the aqueous phase, the improvement comprising adding during said stripping a sodium salt of a copolymer of maleic anhydride and diisobutylene with a molecular weight of approximately 1500 and barium ions.

10. In the process of recovering cis-polyisoprene from a solution thereof in toluene by steam stripping to produce rubber crumb in the aqueous phase, the improvement comprising adding during said stripping a sodium salt of a copolymer of maleic anhydride and diisobutylene with a molecular weight of approximately 1500 and strontium ions.

11. In the process of recovering cis-polyisoprene from a solution thereof in toluene by steam stripping to produce rubber crumb in the aqueous phase, the improvement comprising adding during said stripping a sodium salt of a copolymer of maleic anhydride and diisobutylene with a molecular weight of approximately 1500 and iron ions.

12. In the process of recovering cis-polybutadiene from a solution thereof in toluene by steam stripping to produce rubber crumb in the aqueous phase, the improvement comprising adding during said stripping (1) a water soluble alkali metal derivative obtained by saponification of a polymer of a compound of the formula

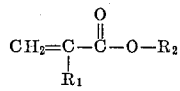

wherein $R_1$ is selected from the group consisting of H and alkyl groups containing 1 to 5 carbon atoms and $R_2$ is selected from the group consisting of alkyl groups containing 1 to 10 carbon atoms and (2) ions of a metal selected from the group consisting of calcium, strontium, barium, aluminum, iron, cobalt and nickel.

13. The process of claim 1 wherein said dispersing agent is added in an amount of 0.05 to 1 part by weight per 100 parts of polymer recovered and said metal ion is added in an amount to provide 0.02 to 2 equivalent weight of metal ion per million parts of water.

14. The process of claim 8 wherein said sodium salt is added in an amount of 0.05 to 1 part by weight per 100 parts of polymer recovered and said calcium is added in an amount to provide 0.02 to 2 equivalent weight of calcium per million parts of water.

15. The process of claim 8 wherein said sodium salt is added in an amount of 0.05 to 0.3 part by weight per 100 parts of polymer recovered and said calcium is added in an amount to provide 0.02 to 2 equivalent weight of calcium per million parts of water.

16. In the process of recovering trans-polybutadiene from a solution thereof in normal hexane by steam stripping to produce rubber crumb in the aqueous phase, the improvement comprising adding during said stripping a sodium salt of a copolymer of maleic anhydride and diisobutylene with a molecular weight of approximately 1500 and calcium ions.

17. In the process of recovering cis-polyisoprene from a solution thereof in normal hexane by steam stripping to produce rubber crumb in the aqueous phase, the improvement comprising adding during said stripping a sodium salt of a copolymer of maleic anhydride and diisobutylene with a molecular weight of approximately 1500 and calcium ions.

18. The process of claim 1 wherein the metal ion used is selected from the group consisting of halides, nitrates, phosphates, hydroxides, bicarbonates, carbonates, formates, acetates, propionates and butyrates of the metals recited.

References Cited by the Examiner

UNITED STATES PATENTS

| | | | |
|---|---|---|---|
| 2,876,203 | 3/59 | Miller et al. | 260—29.7 |
| 2,985,625 | 5/61 | Jones | 260—29.7 |
| 3,035,004 | 5/62 | Glavis | 260—29.7 |
| 3,042,637 | 7/62 | Crouch | 260—94.7 |

FOREIGN PATENTS 130,766  1/49  Australia.

JOSEPH L. SCHOFER, *Primary Examiner.*

L. H. GASTON, WILLIAM H. SHORT, LEON J. BERCOVITZ, *Examiners.*